United States Patent [19]

Weber

[11] Patent Number: 4,948,987
[45] Date of Patent: Aug. 14, 1990

[54] SECONDARY ELECTRIC POWER SOURCE PRODUCED BY CURRENT FLOW THROUGH A PRIMARY A.C. POWER CIRCUIT

[76] Inventor: Harold J. Weber, 313 Washington St., Holliston, Mass. 01746

[21] Appl. No.: 312,820

[22] Filed: Feb. 21, 1989

[51] Int. Cl.⁵ .............................................. H02J 3/00
[52] U.S. Cl. ...................... 307/36; 323/223; 323/230; 323/239; 323/324
[58] Field of Search ............... 323/223, 230, 265, 267, 323/299, 300, 311, 349, 237, 239, 242, 320, 324, 326; 307/11, 17, 36

[56] References Cited

U.S. PATENT DOCUMENTS

| | | | |
|---|---|---|---|
| 3,402,339 | 9/1968 | Abrams | 323/223 |
| 3,873,906 | 3/1975 | Perleman et al. | 323/326 |
| 4,270,058 | 5/1981 | Schornack | 315/360 |
| 4,300,090 | 11/1981 | Weber | 323/267 |
| 4,336,464 | 6/1982 | Weber | 315/360 |
| 4,504,778 | 3/1985 | Evans | 323/324 |
| 4,668,908 | 5/1987 | Aoki et al. | 323/239 |
| 4,878,010 | 10/1989 | Weber | 323/324 |

Primary Examiner—Peter S. Wong
Assistant Examiner—Jeffrey Sterrett

[57] ABSTRACT

Voltage drop developed across a transformer primary winding coupled in series with a primary a.c. power circuit including an a.c. power source and an a.c. load is utilized to provide a secondary source of a.c. power having secondary voltage level stability which is substantially independent from otherwise influential changes in primary power circuit levels. Secondary power stabilization is mainly established by constant voltage limiting of the primary winding excitation by the forward voltage drop developed across an arrangement of semiconductor junctions coupled in parallel with the primary winding. The transformer may be used to change the source level of the secondary a.c. power which is produced, and to obtain electrical isolation between the primary power circuit and any ancillary circuits coupled with the secondary a.c. power source.

20 Claims, 12 Drawing Sheets

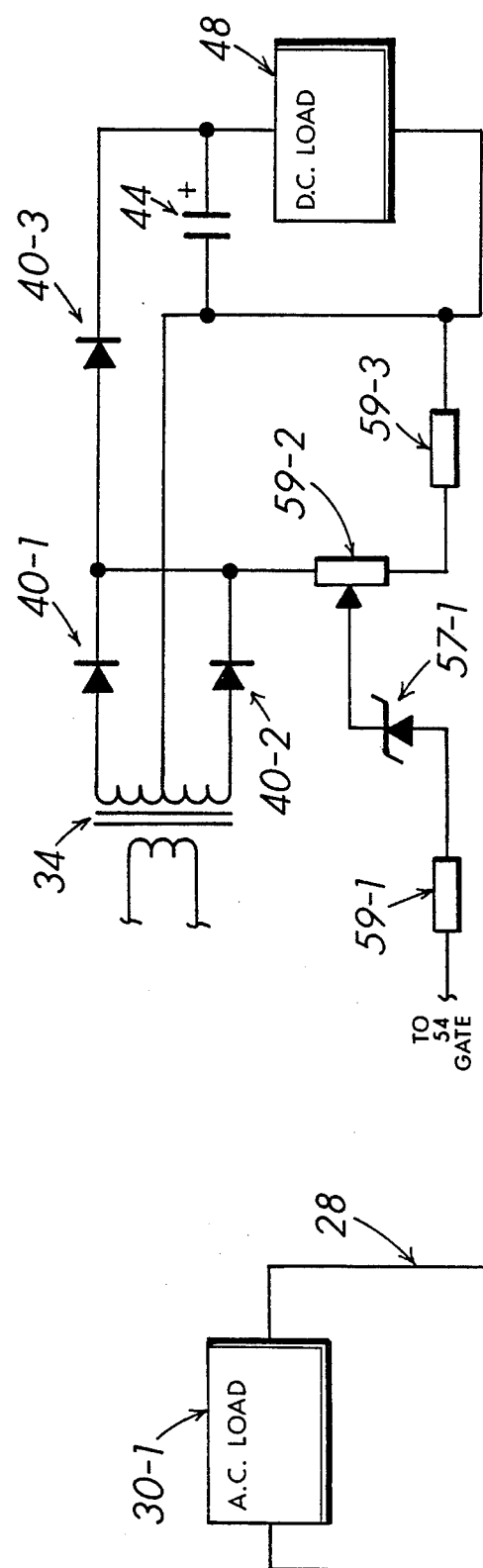
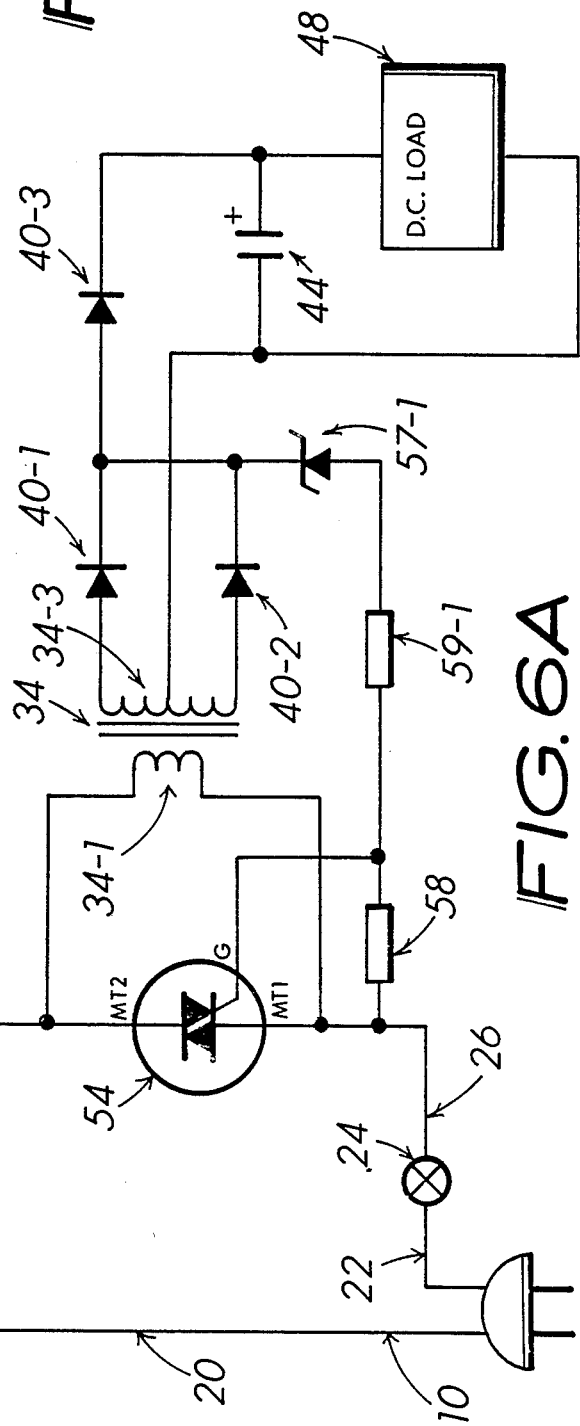
FIG.6B
FIG.6A

SECONDARY ELECTRIC POWER SOURCE PRODUCED BY CURRENT FLOW THROUGH A PRIMARY A.C. POWER CIRCUIT

FIELD OF INVENTION

My invention relates to electrically powered apparatus operating in conjunction with but one side of an a.c. power circuit, depending upon a.c. current flow through the circuit to produce a secondary source of lower level a.c., or d.c. power. A smidgen of stabilized a.c. power is developed across the primary of a step-up transformer, with an increased a.c. level induced in the secondary. This secondary level of induced power may also be rectified, filtered, and used as a source of d.c. power. This secondary source of power may also be fully isolated from the a.c. line. Application of my invention is most suitable for use in circuit hookups where both sides of the a.c. power circuit are not available, or inconveniently accessible, and where it is desirable to obtain safe electrical isolation between the primary a.c. power circuit and the secondary load circuit. Such beneficial application might include low-cost controller apparatus designed to replace ordinary wall-mounted light switches in buildings, and for the operation of circuitry associated with electronic heating/cooling thermostats operating in 24-volt a.c. circuits.

PRIOR ART STATEMENT

I am not aware of any prior art in the immediate subject field of this invention.

BACKGROUND OF INVENTION

A.c. electrical circuits in buildings are commonly wired such that only one side of the circuit is brought to the location where a wall-switch or thermostat might be mounted. When an electronic controller, such as a timer or the like, is used to replace a common wall-switch or thermostat the controller must obtain all of its operating power requirements from the available a.c. power connections. What this implies is that the current flow through the a.c. power circuit must be adapted to provide any d.c. power needed for the controller's operation.

A prior invention of mine, which now appears as U.S. Pat. No. 4,300,090, recognizes the need for such a "2-wire" line-current operated power supply and develops the voltage drop necessary for developing a d.c. level directly across a thyristor. In this earlier arrangement, no isolation is obtainable between the a.c. line and the d.c. power portions of the circuit. This has not prevented its acceptance for use in a number of commercial products, such as the Model ET-600 time switch manufactured by Paragon Electric Company, Two Rivers, Wisconsin; and the Model EI-15 MH and EJ-341 time switches manufactured by Intermatic, Inc., Spring Grove, Illinois.

The use of a thyristor to develop the necessary voltage drop to operate the d.c. power supply, as done in my earlier patent, deprives the a.c. load of a portion of the available a.c. power. Of course the disadvantageous effects of this drop may be insignificant if the developed d.c. voltage level is relatively low (say, on the order of 9 volts) and the a.c. level is relatively high (say, on the order of 117 volts r.m.s.). However, when the d.c. voltage needs are higher, or the a.c. operating voltage is lower, the voltage drop developed across the thyristor and the power loss from the attendant a.c. load circuit may be unacceptable.

In a building HVAC (heating ventilating air-conditioning) thermostat circuit, 24 volts a.c. is a common operating level. When a smart thermostat using electronic circuits is used, it may be desirable to obtain operating potential for the electronic circuits under any thermostat status condition (i.e., closed, open, or with an anticipator hookup) and with an indefinite circuit current flow which depends upon the kind of zone-valve, relay or other device which the thermostat may control. My invention now provides the development of necessitous operating power levels for the electronic circuitry without causing any significant voltage drop in the overall thermostat circuit hookup, and without the costly need for changing the usual 'two wire' hookup typical of most common pre-existing thermostat installations.

My earlier invention, and other known devices producing similar operational advantages, do not provide isolation (electrical separation) between the a.c. power circuit and the d.c. load circuit. In these prior devices, the d.c. circuitry typically may be operating with an a.c. line voltage level above ground imposed upon it. The result is, of course, reduced safety for any persons having access to any of the circuitry portions of a device incorporating the earlier invention. The implied economic disadvantage is that increased (and more bulky and costly) insulation factors are needed, particularly when a product is subject to Underwriter's Laboratory (UL) or other such qualifying agencies requirements. In my instant invention I may obtain full and dependable electrical isolation through the use of a suitable transformer design which alone provides the requisite insulation factors.

In a d.c. power supply based upon my earlier invention, any failure mode of the thyristor that results in non-conduction (e.g., continual open state) of the thyristor will quickly bring about catastrophic failure of the d.c. power supply elements and most likely also any d.c. load apparatus connected with it. This immediate failure of most of the attendant circuit elements occurs because nearly full a.c. line voltage will appear across the thyristor, resulting in excessive rectified d.c. voltage levels. In my instant invention, no active device such as a thyristor is alone used to determine the a.c. levels available for rectification as d.c. power. A small transformer is used, and with suitable design consideration, it can be brought to saturation and become self-limiting before any excessive, potentially damaging, d.c. levels are developed, even if one of the primary current shunt diodes 'opens up' due to failure, or if a thyristor is in fact somehow used as the voltage dropping device and for some reason it doesn't 'turn-on' properly. The transformer primary winding can furthermore be desinged to 'fuse', thereby opening-up and disconnecting the rest of the apparatus from the line thus removing the danger of fire, or accidental electrocution of an user, which may otherwise be present if the power semiconductor fails.

A fundamental hookup of my invention may include merely a small transformer having a primary winding hooked in series with a load-feeding a.c. power line, and two inverse-parallel connected diodes connected in parallel with the transformer primary winding thereby limiting the voltage drop which may develop across the primary winding impedance due to a.c. current flow. A stabilized secondary source of a.c. power may then be obtained from the transformer secondary winding.

In a most basic expression of my invention as a d.c. power supply merely four circuit elements, employed in novel arrangement, and with the arrangement coupled in series with a source of a.c. electric power and a current-drawing a.c. load, may serve to acheive performance results which, prior to my teaching, would require substantially more complicated and costly apparatus to attain the same level of performance and electrical isolation between the a.c. circuit portion and the d.c. circuit portion. These key elements generally comprise: a bilateral power semiconductor element which might include two: two inverse-parallel connected power diodes; a small transformer; a rectifier diode; and a filter capacitor.

Further refinement of my invention provides for replacement of the inverse-parallel connected power diodes with a thyristor which may be turned-ON through a number of approaches, including obtaining a feed-back trigger signal derived from the main secondary or from a tertiary winding on the transformer; or as controlled by the voltage drop developed across the transformer primary winding impedance which unto itself develops a voltage-drop produced signal which is adequate to turn-ON the thryistor and furthermore where such action may be additionally enhanced through an arrangement which provides a breakdown diode coupled in series with the thyristor gate thus enabling the development of a voltage drop considerably (and controllably) in excess of the mere voltage drop devloped across the ON-state semiconductor junctions alone.

SUMMARY

Direct current power is often needed for the operation of electronic devices, such as those which might be employed for timers, temperature controller circuits, occupancy sensors, and other such modern consumer-product oriented apparatus. It is also quite common to make these products in a form which can be expected to replace ordinary wall-mounted light switches, thermostats, and the like. As is common building-trades practice, wall switches and HVAC thermostats often have only one side of the a.c. circuit brought to their location. Therefore, only the current flowing through one side of the a.c. line is available when the switch is ON.

Previous art depends upon developing a voltage drop across a thyristor which is then rectified, filtered and used to provide d.c. power to load circuits. One of the earliest such schemes appears in my U.S. Pat. No. 4,300,090 in which the turn-ON of a thyristor such as a silicon controlled rectifier is delayed until the abrupt breakdown level of a zener diode coupled between the s.c.r. anode and gate occurs, thereby enabling the development of a substantial and repetatively constant peak value of a.c. voltage level between the s.c.r. anode and cathode which may be rectified. This earlier invention is successfully utilized in several commercial products.

In a later filed invention which matured into U.S. Pat. No. 4,336,464 I show how the essence of my d.c. power supply, which is first taught in the U.S. Pat. No. 4,300,090, is brought together with other elements to produce a timed electronic wall switch which operates in conjunction with but one side of the a.c. power line, thereby clearly satisfying a commercial need.

A still later filed invention described in U.S. Pat. No. 4,270,058 also cries about the desirability for operating an electronic device from but one side of the a.c. power. In his invention Schornack merely appears to copy the approach (note application filing dates) shown in my earlier inventions to develop a modest pre-trigger voltage drop across a thyristor which is subsequently rectified, filtered and used as a source of low level d.c. power for attendant circuit operation.

My invention now advances beyond the limitations of these earlier art-forms in that I not only have satisfied the earlier sought advantages of operating from but one side of the a.c. line, but I now also:

a. Provide complete isolation between the a.c. line primary power portion of the circuit and the secondary power and load portion of the circuit.

b. Provide considerably flexibility in the value of the secondary power level which may developed in that it is even practical to develop a secondary power potential level which is higher than than the level of the available primary circuit potential.

c. Provide safeguard that failure of the primary side components will not cause a condition of dangerously high secondary power levels which might lead to unsafe operation of the attendant product apparatus or fire.

d. Provide dynamic feedback between the primary and secondary portions of the circuit which may serve to stabilize the secondary power levels.

These and other advantages of my invention will be appreciated by any person skilled in the art after review of my drawings and attendant description.

DESCRIPTION OF DRAWINGS

Twelve sheets of drawings conveying 14 figures provide support for description of my invention, including:

FIG. 4-B Use of a capacitor's impedance in lieu of a resistor to develop OFF state secondary d.c. voltage is depicted.

FIG. 6-A Thyristor clamping of transformer primary voltage level is determined by trigger signal derived from main secondary of the transformer.

FIG. 6-B Shows how the primary excitation voltage level may be made adjustable.

DESCRIPTION OF MY INVENTION

Figure 1:
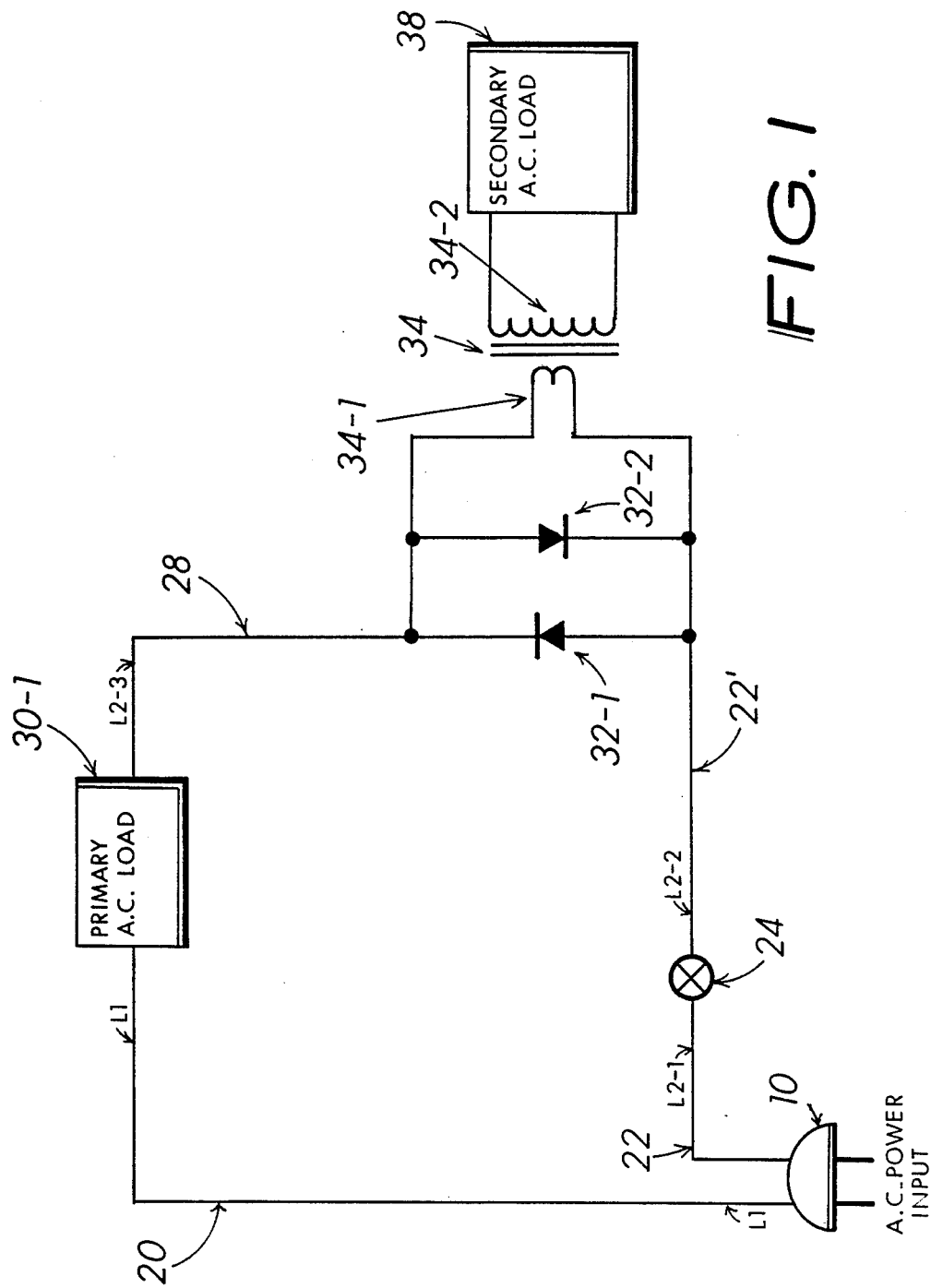
FIG. 1 Fundamental arrangement of invention providing a.c. power to a secondary load.

Alternating current electric power couples 10 with my invention as it appears in FIG. 1. One side L1 of the a.c. power line is directly coupled 20 with primary a.c. load 30-1, such as a light bulb, electric motor, or other such device. The other side of the a.c. power circuit line L2-1 is coupled 22 in series with a switch 24 that couples 22' via line L2-2 with two inverse parallel connected (e.g., back-to-back) power diodes 32-1, 32-2 and then with line 28 to the other side L2-3 of the load 30-1. When a.c. power flow from the source to the load occurs, a voltage drop occurs across each of the diode 32-1, 32-2 semiconductor junctions which is substantially independent of current value over a range within the current rating of the diodes' junctions. Normally about 0.7 volts may be expected to develop across each diode, thereby producing a combined value of about 1.4 volts peak-to-peak. A transformer 34 is provided having its primary winding 34-1 connected across the diodes 32-1, 32-2 with a result that current flowing through the impedance of the primary may develop an a.c. voltage drop which is limited in value to the voltage drop which develops across the diodes. As a result, the 1.4 volt p-p level present on the transformer primary winding in such an arrangement induces a.c. power in the transformer secondary winding 34-2 which might excite a secondary a.c. load 38, for example a small light bulb. It must be recognized that it is the current flow through the primary a.c. load circuit, including lines 22 and 28, which brings about current flow in the transformer primary 34-1. The purpose for the diodes 32-1, 32-2 is merely to clamp any reactive voltage drop which may appear across the transformer primary 34-1 to a fixed maximum level, as in this case to about 1.4 volts p-p and to shunt away any primary a.c. current in excess of the value needed for primary winding excitation of the transformer. In a preferred utilization of my invention, the current flow through the primary load circuit (and thus through the transformer primary 34-1) is many times greater than any primary current sought by the transformer due to secondary a.c. load circuit power loading. Said another way, the a.c. power in amperes through the primary side of the a.c. power circuit is large, while the a.c. power supplied to the secondary load is small. Under such conditions, the primary circuit a.c. waveform is nearly trapazoidial.

It is important to understand that the power switch 24 may connect and disconnect power-flow through the circuit's primary path by merely controlling that portion of the circuit which includes lines 22 and 22'. The importance of this is that the switch might be a common wall switch of the kind commonly used in construction trades for room-lighting control, or the contacts of a HVAC thermostat. It is also ordinary practic to run merely two lines to the wall switch or thermostat location, and therefore if my invention were to power some gadget such as a timer which is to be located at the wall-switch or thermostat location, only lines 22 and 28 would be needed. You will find that I clearly show that my power supply may obtain its full operating requierements from merely one side of the a.c. power circuit, and that it is substantially independent from the voltage level in that circuit.

Figure 2:
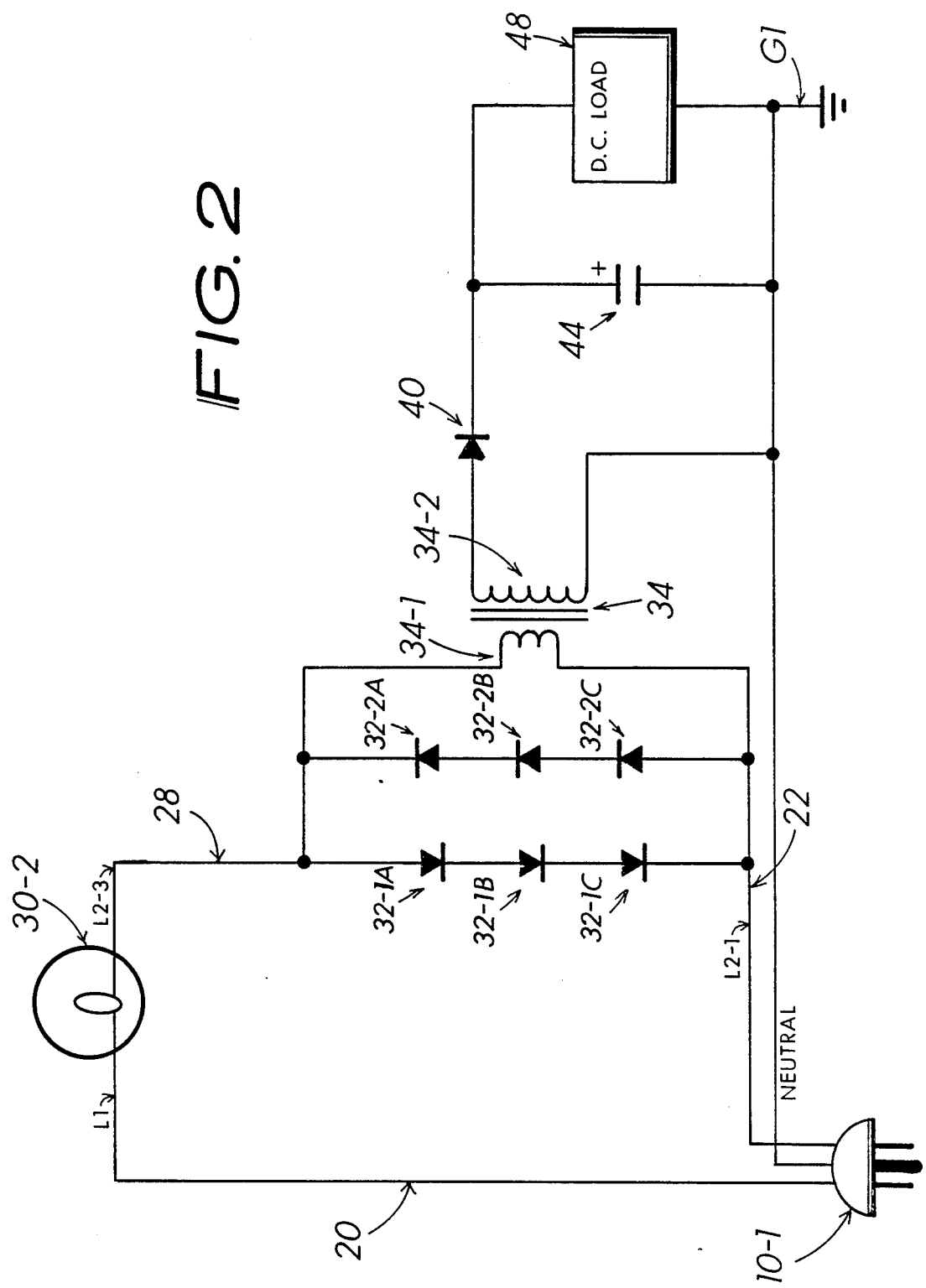
FIG. 2 Arrangment of invention providing d.c. power to a secondary load.

The action of the diodes 32-1, 32-2 of FIG. 1 may be further enhanced as I now show in FIG. 2 to include several diodes hooked in series and operating in concert. My three diodes 32-1A, 32-1B, 32-1C are equivalent to diode 32-1 of FIG. 1, whilst diodes 32-2A, 32-2B, 32-2C replace the other diode 32-2 of that figure. If two three-diode groups are used, as I give merely as an example, about 4.2 volts peak-to-peak will be coupled with the transformer 34 primary 34-1, thereby providing more power to the transformer primary. Such an arrangement offers particular advantage when the lamp 30-2 is small, or more secondary load power is needed from the supply.

The secondary winding 34-2 of the transformer couples through a power diode 40 (perhaps a 1N4002) and thus with an capacitor 44 (say about 200 uf). If the transformer 34 has about a 1:6 primary to secondary step-up, about 25.2 peak-to-peak a.c. volts will be present across the secondary winding 34-2, and thus with the ordinary half-wave rectifier arrangement which I show, about 8 to 9 volts d.c. will appear across the capacitor 44, with the instant value depending upon the loading presented by the d.c. load 48. You will also see that the NEUTRAL (safety ground) of the primary a.c. power circuit (as shown to be coupled through the "ground pin" of the plug 10-1) may safely be connected to the "ground" side G1 of the d.c. power supply portion of the circuit. This arrangement, wherein virtually total isolation is obtained between the primary a.c. power circuit and the secondary a.c. (or d.c.) power circuit is of great importance in my invention in that it affords heretofore unobtained electrical safety for a power supply that is excited from current flowing through but one side of the primary a.c. power circuit.

Figure 3:
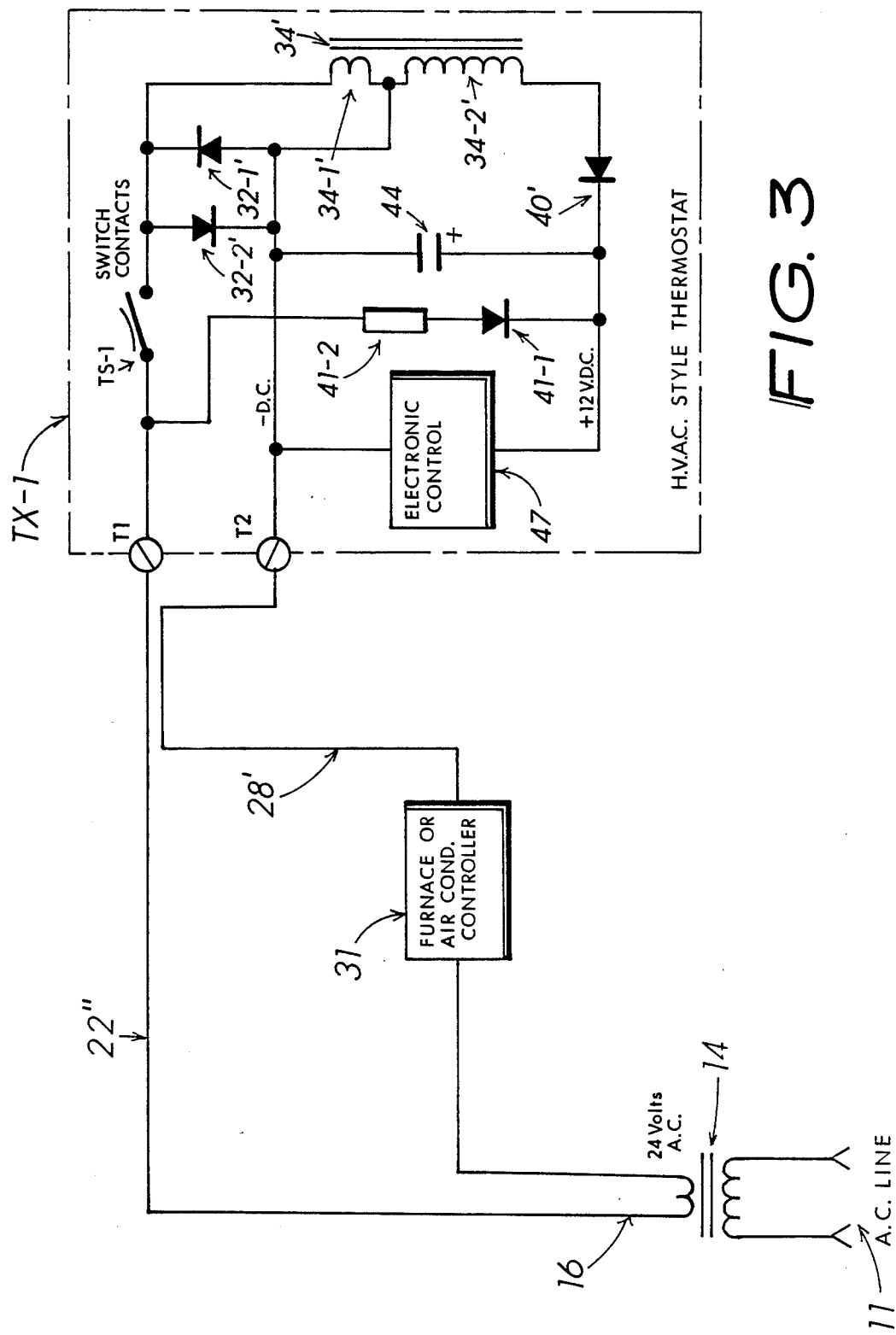
FIG. 3 HVAC thermostat including power supply of invention.

My invention's use with a common HVAC wiring arrangement is depicted in FIG. 3. The a.c. line 11 couples with the primary of a control transformer 14 that usually produces about 24-volts a.c. from its secondary 16. In the usual building-trades practice arrangement, the control portion of a furnace of air conditioner 31 connects in series between the transformer primary and a "HVAC style" thermostat TX-1 via terminals T1, T2. I now show my invention included in the thermostat TX-1 to include the a.c. clamping diodes 32-1', 32-2' and a transformer 34' having a primary 34-1' hooked in parallel with the clamping diodes, and a secondary winding 34-2' that produces a somewhat higher voltage which may be rectified by diode 40' to develop a d.c. voltage across the capacitor 44 that can serve to operate any electronic control circuits 47 which might modulate or time the performance of the thermostat. In this illustrative arrangement, a thermally activated contact set TS-1 acts to open and close the thermostat circuit. When the contacts set is CLOSED, current flow through the transformer 34' provides the d.c. power. Alternatively, when the contact set is OPEN, no substantial current flows through the circuit and therefore the d.c. voltage is developed across capacitor 44 by the action of diode 41-1 (connected in series with voltage dropping resistor 41-2) which serves to rectify the relatively high (e.g., about 33-volt peak a.c.) level which appears across the OPEN contacts TS-1.

Figures 4A, 4B:
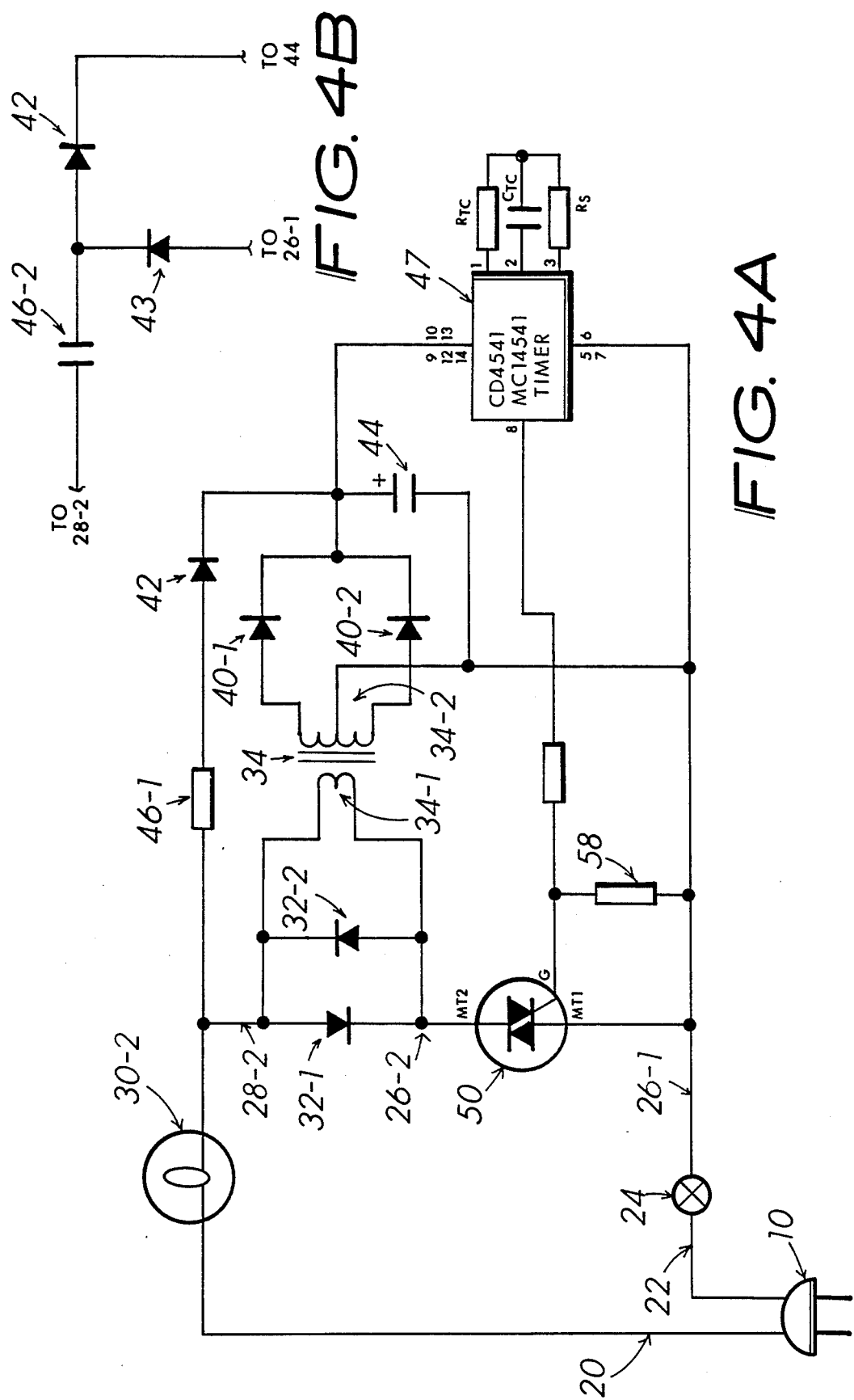
FIG. 4-A Electronic timer showing on/off control of primary a.c. power circuit and including invention's power supply.

An electronic timer hookup is shown in FIG. 4-A which includes the power supply of my invention. This particular combination of elements illustrates an application which is attractive as an ordinary wall-switch replacement in order to obtain timed-OFF operation of a room light or the like. A thyristor 50 (viz a Triac such as a Teccor Electronics Inc. type Q2004F31) is coupled between line 26-1 and 26-2 in one side of the primary load circuit, which includes the transformer 34 and one side of the lamp 30-2 as fed by line 28-2, while the other side of the lamp couples with the other side of the primary power line 20. When switch 24 is initially 'closed' and the thyristor 50 is initially OFF and thus full primary line voltage appears across it (as coupled from the other side of the line through lamp 30-2). Under such condition, rectifier 42 supplies unidirectional charge to the capacitor 44 through current limiting resistor 46-1. As the charge across the capacitor 44 rapidly builds up, the integrated circuit timer 47 (shown as a Motorola MC14541 or GE/RCA CD4541) produces a HIGH level from pin 8 which couples with the gate of the thyristor 50, turning it ON. The lamp 30-2 then becomes lighted, and substantial current flows through the primary 34-1 of transformer 34 resulting in an induced voltage in the secondary 34-3 that is rectified by the full-wave rectifier arrangement of diodes 40-1, 40-2 to provide charge to capacitor 44 in the absence of any substantial voltage drop across the thyristor 50 when it is in the ON state. When the timer 47 eventually times-OUT, its pin 8 output is driven LOW resulting in negligible gate current for the thyristor 50, whereby it turns-OFF. When this state occurs, d.c. charge is maintained across the capacitor 44 due to the resumed rectification action of diode 42-1, thus maintaining necessitous off-state operating levels for the integrated circuit timer 47.

In FIG. 4-B I show a variation for deriving d.c. power when the thyristor is OFF whereby the ballast resistor 46-1 of FIG. 3-A is replaced with the reactive impedance offered by a capacitor 46-2. A diode 42-2 provides a return path for capacitor 46-2 during the negative half-cycle of the a.c. power appearing on line 28-2. This circuit variation offers the advantage of less power loss than that of the resistor 46-1, but at the expense of a capacitor 46-2 and diode 42-2 instead of the singular use of the cheaper and usually less bulky resistor 46-1.

Figure 5:
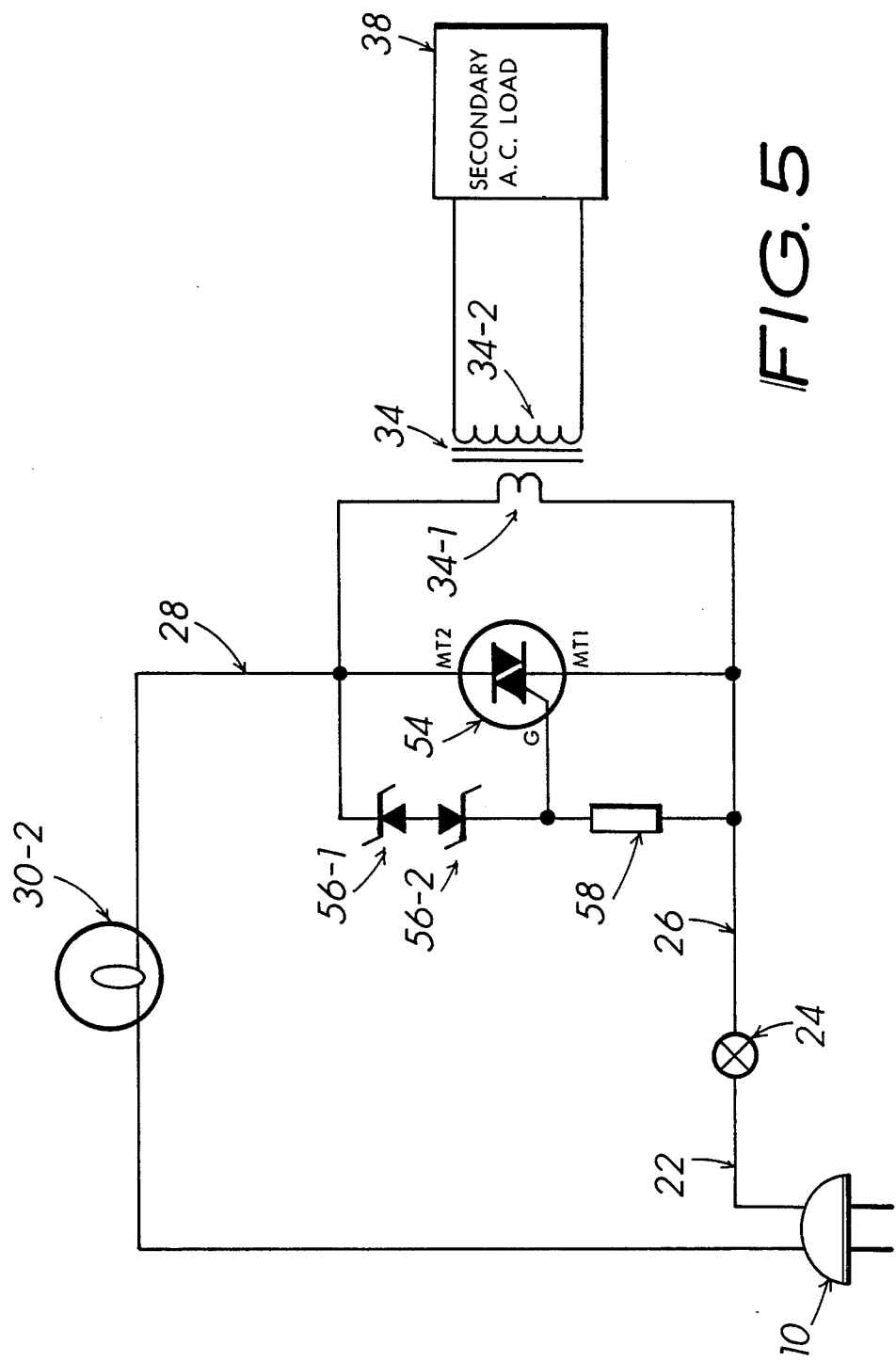
FIG. 5 Thyristor clamping of a.c. voltage developed across transformer primary impedance is controlled by zener diode break-down levels.

A bilateral thyristor (e.g., a Triac) 54 appears in FIG. 5 hooked-up effectively in place of the diodes 32-1, 32-2 of the preceding figures. Two series connected back-to-back zener breakdown (avalanche) diodes 56-1, 56-2 are shown to be coupled between the thyristor power terminal MT-2 and its gate. A low value resistor of say 1,000 ohms or less is also coupled between the gate and power terminal MT-1. As the a.c. voltage rises from zero in the positive direction during the a.c. cycle first quadrant (as it appears on line 28 as coupled through the load 30-2 from line 20) the voltage effectively appearing between the thyristor terminals MT-2 relative with MT-1 increases to a point where zener diode 56-2 breaks-down thus injecting current into the gate of the thyristor, turning it ON. The thyristor then conducts throughout the rest of the positive half-cycle first and second quadrants, commutating again (e.g., turning OFF) when the positive voltage decreases on the second quadrant of the a.c. cycle and "zero crossover" occurs into the negative-going third quadrant. In a like way, as the voltage increased in a negative direction during the third quadrant of the a.c. cycle, a predetermined value will be reached where diode 56-1 breaks-down, thus again turning the thyristor ON throughout the rest of the third and fourth quadrants until fourth quadrant zero-crossover occurs and the thyristor again commutates OFF. It is the smallish voltage which develops across the transformer primary impedance and appears across the thyristor 54 just prior to breakdown of either zener diode 56-1 or 56-2 during the respective first or third quadrant of the a.c. power cycle that serves to excite the primary of the transformer 34-1.

You should recognize that, unlike the squarish waveform provided across the transformer primary by the clamping action of the diodes as taught by the preceding figures, the voltage (and resultant current) waveform now appearing across the transformer primary is of larger peak magnitude but of shorter, more pulse-like waveshape. In any event, through predetermination of the zener diode 56-1, 56-2 breakdown levels considerably more peak-to-peak voltage may be developed across the transformer primary winding 34-1 than what may be practical with the connection arrangement of diodes alone.

In FIG. 6-A I show how feedback of the secondary power may effect control of the thyristor 54 to obtain regulation of the d.c. power applied to the secondary d.c. load 48. In this arrangement, the transformer secondary 34-3 is center-tapped and two rectifier diodes 40-1, 40-2 act as conventional full wave rectifiers. A third isolation diode 40-3 is also provided, which establishes that the signal appearing at the juncture of diode 40-3 anode with the cathodes of diodes 40-1, 40-2 is pulsating and not affected by the charge stored in capacitor 44. This permits the positive-rising pulses to reach a point where zener diode 57-1 breaks-down, conducting current through limiting resistor 59-1 into the gate of the thyristor 54. Resistors 58 and 59-1 may each typically be about 470 ohms. The overall effect is some modulation of the level where thyristor 54 is turned ON, with that level being determined by the level of the rectified voltage developed from the transformer secondary as permitted by the loading of the load 48. The zener diode 57-1 is normally picked to have a breakdown voltage which is about equal to the desired d.c. voltage level to be developed across the capacitor 44.

A potentiometer 59-2 and resistor 59-3 may also be arranged as a voltage divider as shown in FIG. 6-B, with the zener diode 57-1 coupled with the potentiometer wiper-arm. The result is that some adjustment of the secondary d.c. load potential as devloped across capacitor 44 may be obtained. As the wiper-arm nears the upper end (nearest the diodes), the thyristor 54 will trigger sooner resulting in a reduction of d.c. voltage as rectified and developed across the capacitor 44. Moving the wiper-arm down (nearest the resistor 59-3) conversely results in increasing the developed d.c. voltage.

Figure 7:
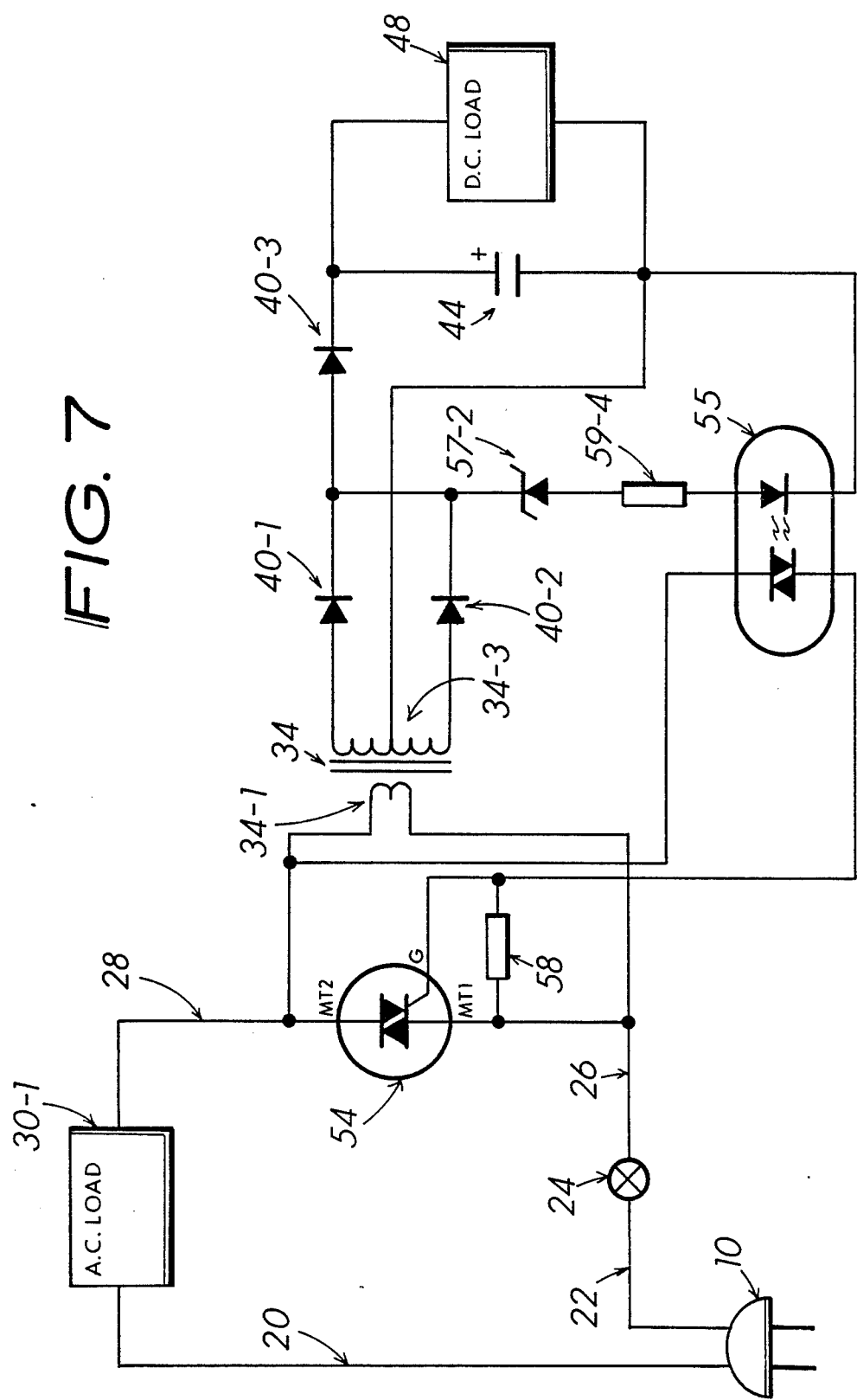
FIG. 7 Optocoupler is shown to obtain primary/-secondary circuit isolation.

While the secondary load of FIG. 6-A is non-isolated from the primary a.c. power circuit, this drawback may be overcome through the innovation of FIG. 7 where an optical coupler device 55 is used to convey the turn-ON signal developed by the breakdown of the zener diode 57-2 to the thyristor 54 gate. In this form, zener conduction as coupled through resistor 59-4 results in a pulse of light to be emitted by the L.E.D. portion of the optocoupler which acts to turn on the light-activated bilateral switch portion thus inducing gate current into the thyristor gate. Because optocoupling is used, total electrical isolation is obtained between the primary a.c. power and secondary load circuits. The d.c. portion of this circuit may therefore also be coupled to the primary a.c. power source NEUTRAL (e.g., "earth ground") as was shown for FIG. 2, thereby obtaining exceptional secondary circuit safety.

Figure 8:
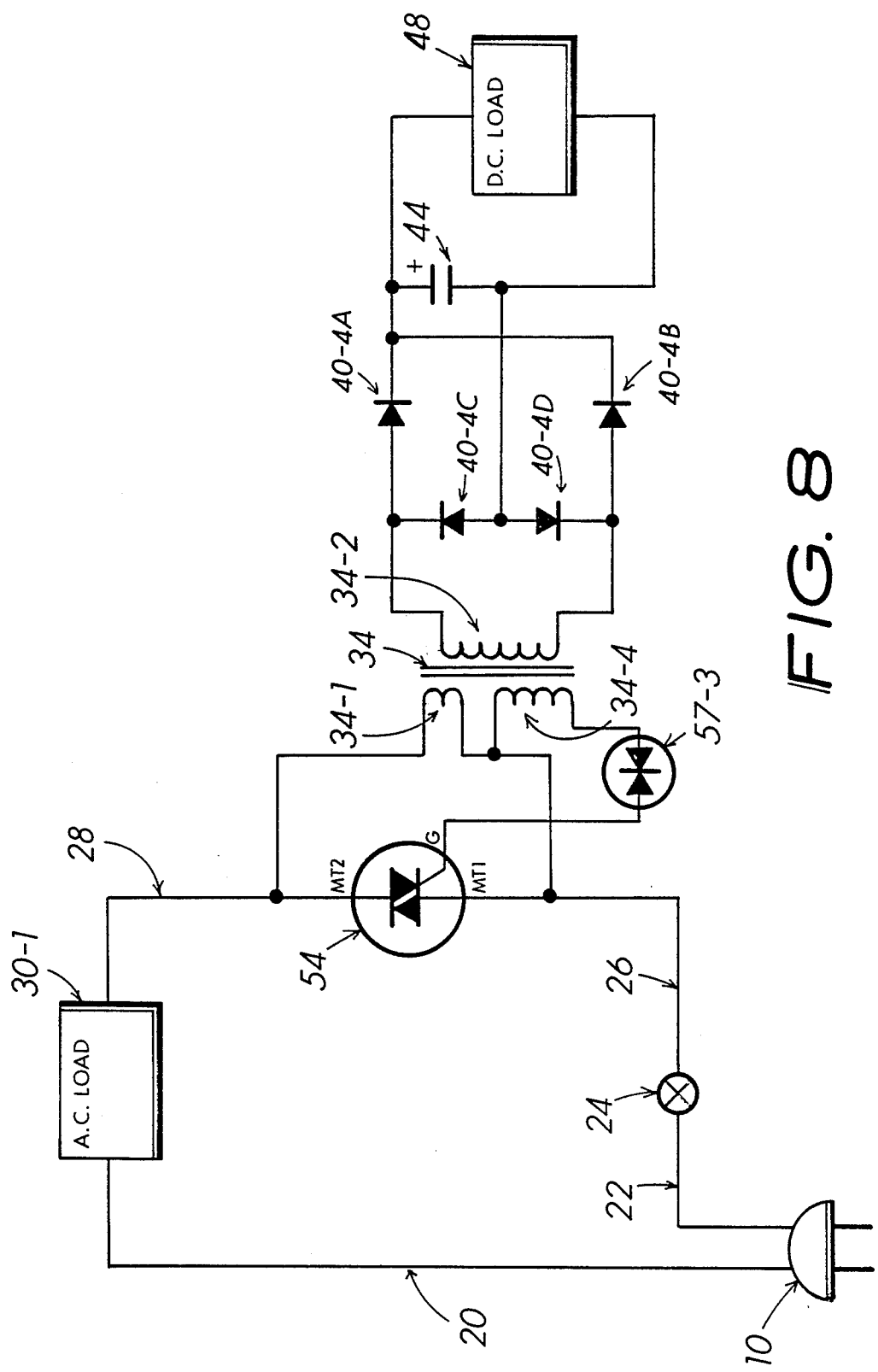
FIG. 8 Tertiary winding serves to trigger thyristor when desired primary voltage drop level is obtained.

A tertiary winding 34-4 may also be used as shown in FIG. 8 to obtain isolation between the primary and secondary portions of the circuit. Through proper predetermination of the turns ratio relationships between the several transformer windings, a signal may be developed in winding 34-4 that is of sufficient magnitude to supply current through a silicon bilateral switch 57-3 (such as a 2N4991) that will turn the thyristor ON whenever the secondary load level requirements are satisfied. I also show that the secondary winding 34-2 is rectified by a full-wave bridge arrangement (using diodes 40-4A, 40-4B, 40-4C and 40-4D) in this illustrative hookup.

Figure 9:
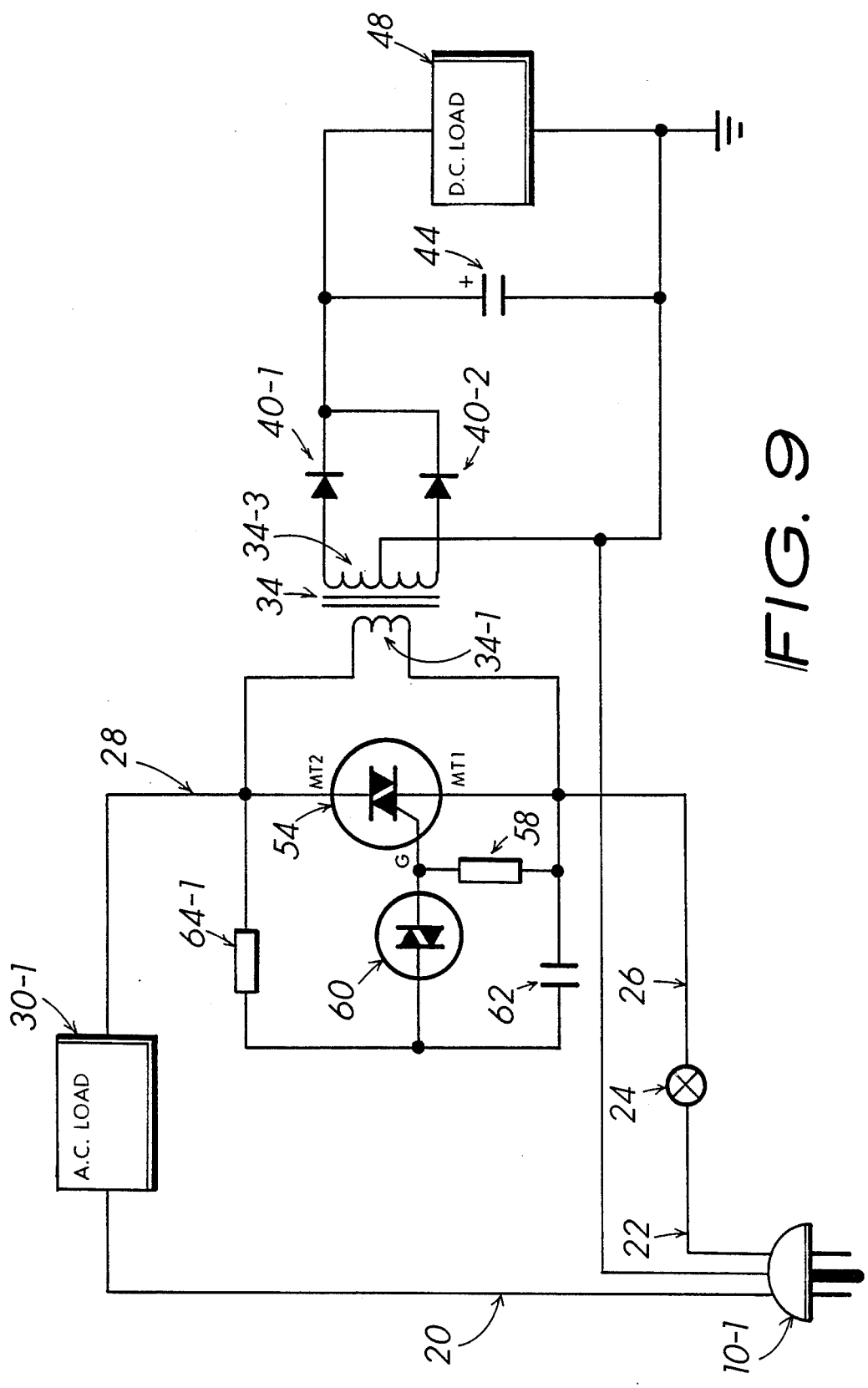
FIG. 9 Increased trigger current pulse is provided by "phase control" circuit using device such as a diac to dump a capacitor's charge into thyristor gate.
Figure 10:
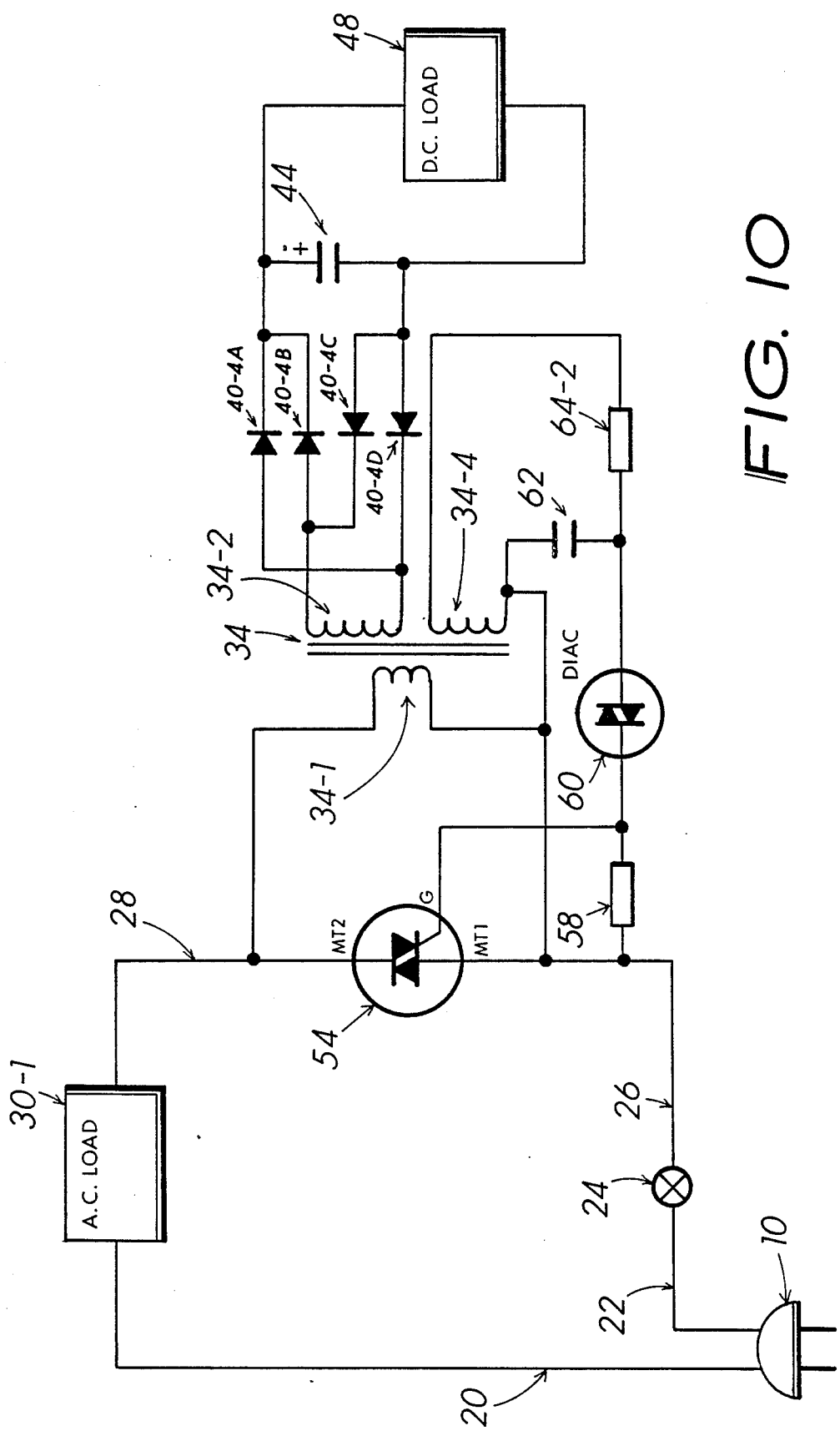
FIG. 10 A separate tertiary winding serves to provide "phase control" circuit triggering of thyristor.

When the a.c. load 30-1 is of such a level that the thyristor 54 must have considerable power rating, it may be preferable to use a configuration like that of FIG. 9 and to trigger the thyristor gate trigger producing device (i.e., a Diac or equivalent such negative-resistance device) 60 which serves to discharge the energy stored in a capacitor 62 as a gate pulse having considerable instantaneous current. Through selection of resistor 64-1 and capacitor 62 values, proper operation is obtainable with only slight phase delay. The main delay will be introduced by the relatively large breakover voltage rating of the usual Diac. Such voltages are commonly on the order of 25-45 volts, resulting in a 50-90 volt peak-to-peak primary pulse voltage on the transformer primary 34-1. This relatively large primary voltage may sometimes be undesirable, and therefore a tertiary winding 34-4 like that shown in FIG. 10 may be hooked-up to provide the necessary Diac voltage through resistor 64-2 that charges capacitor 62. If the winding 34-4 has properly predetermined step-up characteristics, the voltage appearing across the transformer at the moment of Triac 54 turn ON may have considerable option.

Figure 11:
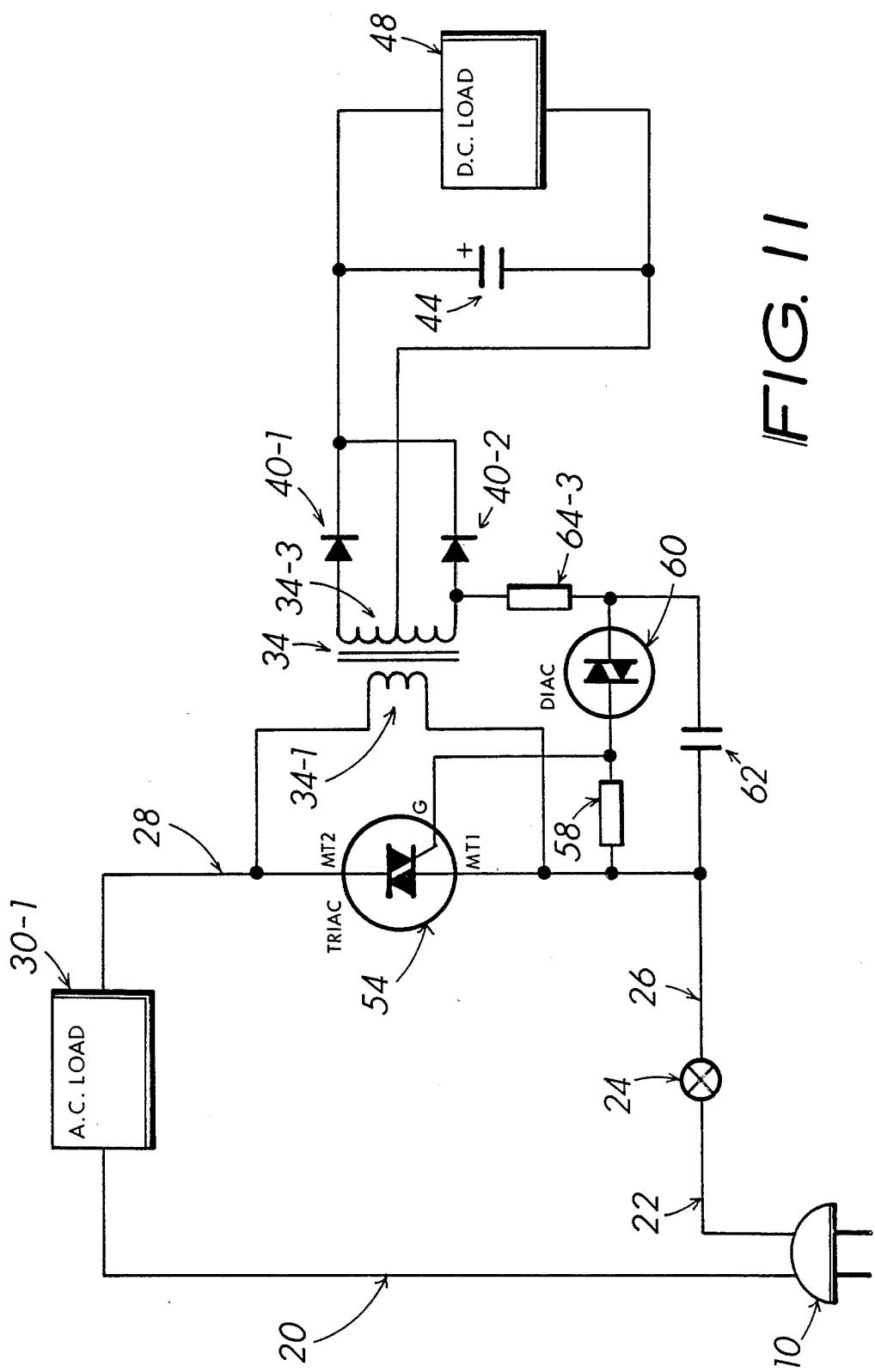
FIG. 11 Feedback from main secondary of transformer determines "phase control" circuit triggerion of thyristor.

The Diac 60 may also obtain its trigger control signal from the secondary 34-3 of the transformer when hooked-up like I show in FIG. 11. The secondary voltage from the transformer flows through resistor 64-3 to charge the capacitor 62 to a level sufficient to obtain breakover of the Diac (or SBS) device 60. When this occurs, Triac 54 turns ON. In this arrangement, the secondary load d.c. voltage developed across capacitor 44 is about the level of the breakover voltage value of the Diac 60.

Figure 12:
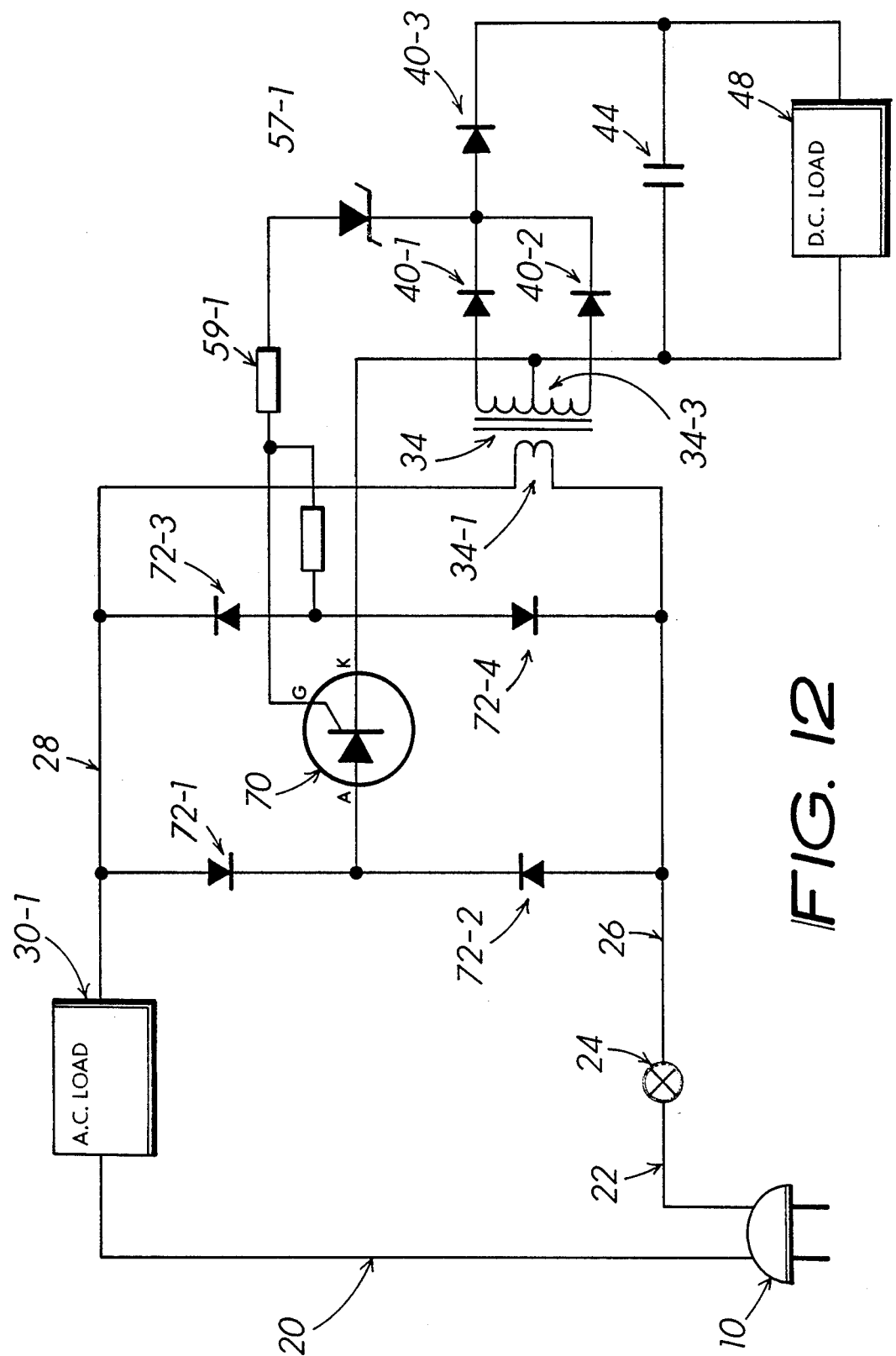
FIG. 12 Silicon controlled rectifier together with diode bridge arrangement emulates action of triac for controlled clamping of transformer primary voltage drop.

In FIG. 12 the thyristor 70 is shown as a silicon controlled rectifier (SCR), such as a General Electric C107B1 or the like which is located across a bridge arrangement of power diodes 72-1, 72-2, 72-3, 72-4 which together act like a bilateral switch, much like the intrinsic behaviour of a triac. In this depiction, the voltage breakdown pulse developed across the zener diode 57-1 such as earlier taught in FIG. 6-A serves to trigger the gate of the SCR 70 whenever the voltage as reflected into the transformer secondary 34-3 by the voltage drop which develops across the impedance of the primary 34-1 is of sufficient value.

Each of my illustrative circuits serves to teach how a secondary source of power may be obtained from the current flow through one side of a primary a.c. power circuit. It is believed obvious that any of the features of the different figures may be interchanged as may be applicable. It is also clearly obvious that other primary and secondary load circuit configurations may be used without departing from the substance of my teaching. It is also considered obvious that adjustment of the developed secondary load level may be obtained through the mere expedient of replacing resistor 64-2 with a rheostat in the teaching of FIG. 10, for example. I thus propose that any skilled artisan may be reasonably expected to introduce considerable variation in the detail of these illustrative implementations and yet not depart from the essence of my central teachings.

What I claim is:

1. Power supply method for obtaining a secondary source of electrical power from current flowing through an alternating current primary power circuit, comprising the steps of:
    providing a primary power circuit including a source of a.c. power and a load;
    coupling a primary winding means of a transformer effectively in series with primary power circuit;
    exciting the primary winding means by current flow through the primary power circuit;
    developing a voltage drop across the primary winding means by said current flow therethrough;
    coupling bilateral semiconductor device means effectively in parallel with the primary winding means;
    predetermining a bilateral level of forward voltage drop permitted across said semiconductor device means;
    limiting the voltage drop developed across the primary winding means to that of the the bilateral level of semiconductor device forward voltage drop;
    providing the transformer with a main secondary winding means which may serve to excite a secondary load means.

2. Power supply method of claim 1 comprising the further steps of:
    rectifying any a.c. power developed across the main secondary winding means;
    filtering said rectified a.c. power; and,
    coupling said rectified and filtered a.c. power with said secondary load means for the direct current excitation thereof.

3. Power supply method of claim 1 comprising the further steps of:
    providing said bilateral semiconductor device means as comprising a first diode means and a second diode means coupled inverse parallel to effect bilateral a.c. primary power flow therethrough;
    developing about 0.6 to 1 volt forward voltage drop across each semiconductor junction comprising said diode means prior to the onset of any substantial current flow through the diode means;
    clamping any voltage drop developed across the primary winding means to a level not substantially exceeding any total value of bilateral forward voltage drop developed across the plural diode means; thereby,
    stabilizing any voltage level developed in the main secondary winding means of the transformer over a wide range of variation of power flow through the primary a.c. power circuit.

4. Power supply method of claim 1 comprising the further steps of:
    providing said bilateral semiconductor device means as thyristor means having plural power terminal means coupled effectively in series with said primary power circuit and effectively in parallel with said primary winding means, and having gate terminal means effective for receiving a trigger signal to enable "turn-ON" of primary power circuit current flow between said power terminals;
    coupling voltage breakdown device means effectively between said gate terminal means and extremer power terminal means of said thyristor;

selecting said breakdown device means to have an intrinsic breakdown (viz breakover or avalanche) voltage which is substantially less than the primary power circuit peak a.c. voltage value;

permitting a few volts of voltage drop to develop across the primary winding means and between the thereto coupled thyristor power terminal means during a portion of each a.c. power cycle;

further permitting said few volts to have a value determined to be mainly about the sum of the breakdown voltage of the breakdown device means and the intrinsic thyristor gate voltage drop of about 0.6 to 1 volt;

effecting trigger signal current flow into the thyristor gate means as provided through the breakdown device when the few volts of voltage drop permitted across the thyristor main terminals is exceeded;

effecting "turn-ON" of the thyristor means in response to said trigger signal current flow;

maintaining substantially full thyristor means conduction throughout any instant half-cycle of a.c. power flow thereby limiting current flow through the primary winding means; thereby, providing stabilized excitation of the transformer primary winding means to a level predetermined by the voltage drop permitted thereacross prior to thyristor conduction.

5. Power supply method of claim 1 comprising the further steps of:

providing said bilateral semiconductor device means as a thyristor means having plural power terminal means coupled effectively in parallel with the primary winding means and having a trigger signal receiving gate means effective for initiating conduction bewteen the power terminal means during a portion of each a.c. power cycle;

providing said transformer means with an ancillary secondary winding means effective for producing a voltage signal thereacross which is inductively derived from the current flow impressed across the primary winding of the transformer;

coupling said ancillary secondary means with said gate means;

triggering said thyristor "ON" usually during each successive a.c. power half-cycle whenever the voltage signal developed across the ancillary secondary exceeds a predetermined level; and, developing an a.c. voltage drop signal between the power terminals of the thyristor prior to successive a.c. power half-cycle "ON" states and having a value proportional to that of the ancillary secondary's predetermined voltage signal level, which serves to excite the transformer primary and produce a desired secondary power circuit level from the transformer's main secondary.

6. Power supply method of claim 1 comprising the further steps of:

providing said bilateral semiconductor device means as a thyristor means having plural power terminal means coupled effectively in parallel with the primary winding means and having a trigger signal receiving gate means effective for initiating conduction between the power terminal means during a portion of each a.c. power cycle;

deriving a gate control signal from a portion of the power signal level developed across main secondary of the transformer;

coupling said gate control signal with the thyristor gate means;

trigger said thyristor "ON" whenever the level of the gate control signal exceeds a predetermined level;

developing a voltage drop between the power terminals of the thyristor prior to "turn-ON" sufficient to excite the tranformer primary and produce a desired level of power from the transformer's main secondary.

7. Power supply means producing a secondary source of power which is derived from current flowing through a portion of a primary power circuit including seriate coupling of a source of a.c. electric power and a primary a.c. load means, comprising:

transformer means comprising inductively coupled primary and secondary winding means;

means for coupling said primary winding means substantially in series with the primary power circuit and develop an a.c. voltage drop across the primary winding means as a result of a.c. current flow through the primary power circuit;

semiconductor means coupled substantially in parallel with te primary winding means and effective for limiting the value of the developed a.c. voltage drop to a small and substantially constant value; and, secondary load means coupled with said secondary winding means.

8. Said semiconductor means of claim 7 means comprising two inverse-parallel coupled power diode means whereby the developed a.c. voltage drop is about the sum of the voltage drop developed across each semiconductor junction comprising the power diode means.

9. Power supply means of claim 8 utilized as a portion of a thermostat means utilized in a low-voltage control circuit and comprising:

means for providing a low-voltage source of a.c. power;

means for producing an effect in response to a low-voltage a.c. power signal;

means for changeably coupling and interrupting the flow of low-voltage a.c. power between the low voltage source means and the effect producing means;

means for coupling the primary winding means of the transformer in series with any a.c. power flow coupled between the low voltage source means and the effect producing means; and, means for coupling the power diode means effectively in parallel with the primary winding means thereby limiting any voltage which may develop across the primary winding means to that of the forward voltage drop of the power diode means.

10. The semiconductor means of claim 7 wherein:

said semiconductor means comprises thyristor means having two power terminal means coupled substantially in parallel with the primary winding means and having gate means effective for initiating conduction through said thyristor means;

means for developing a gate drive signal coupled with the thyristor gate means; and, means for determining the gate drive signal to occur during each a.c. power half-cycle whenever the instant level of the a.c. voltage drop developed across the primary winding means by primary a.c. power circuit current flow reaches a predetermined value.

11. Gate drive signal determining means of claim 10 comprising breakdown device means coupled between the thyristor gate means and the main secondary means of the transformer, effective to produce a gate drive signal whenever the voltage level developed across the main secondary means exceeds a predetermined value.

12. Gate drive signal determining means of claim 10 comprising breakdown device means coupled between the thyristor gate means and an ancillary secondary means coupled with the transformer primary means, effective to produce a gate drive signal whenever the voltage level developed across the ancillary secondary means exceeds a predetermined level.

13. Gate drive signal determining means of claim 10 comprising a trigger producing means together with a charge storage capacitor and a charging resistor, coupled together so as to produce a trigger signal into the gate of the thyristor means when the voltage developed across the trigger producing means exceeds a predetermined value and whereby the developed voltage is derived from one of the voltage produced in the transformer main secondary winding, the voltage produced across the transformer primary, and the voltage produced in any ancillary transformer winding.

14. Gate drive signal determining means of claim 10 comprising a breakdown device means coupled with the voltage signal produced in the transformer secondary winding means, and said breakdown device means also coupled with the emitter portion of an optocoupler means thereby providing for the producing of a pulse signal in the receptor portion of the optocoupler when the voltage signal exceeds a predetermined value, thereby producing a signal which may couple with and trigger the thyristor gate.

15. Gate drive signal means of claim 10 comprising breakdown device means coupled between the thyristor gate means and the thyristor power terminal means usually identified as being one of anode or main-terminal-two (MT-2).

16. Power supply means producing a secondary source of power which is derived from current flowing through a portion of a primary power circuit, comprising:
   means for producing a primary source of alternating current electric power having a value of at least several volts;
   primary load means coupled in series with and drawing alternating current from the primary source;
   transformer means comprising inductively coupled primary and secondary winding means;
   means for seriately coupling the transformer's said primary winding means with the primary source of electric power and the primary load means; and,
   means for limiting any peak-to-peak a.c. voltage drop which may develop across the primary winding means as a result of primary load means current flow to an essentially constant level; and,
   secondary load means coupled with said secondary winding means.

17. Power supply means of claim 16 wherein said limiting means comprises bilateral semiconductor means coupled substantially in parallel with the primary winding means and with the bi-directional alternating current forward voltage drop of the semiconductor means serving to determine the said constant level of voltage which may develop across the primary winding means.

18. Power supply means of claim 17 wherein said bilateral semiconductor means comprises a plurality of inverse-parallel coupled semiconductor diode means with the resulting bi-directional alternating current forward voltage drop being substantially the sum of all forward voltage drops produced by semiconductor junctions comprising the plural diode means.

19. Power supply means of claim 17 wherein said bilateral semiconductor means comprises bi-directional thyristor means with the resulting bi-directional alternating current forward voltage drop being substantially determined by a gate trigger level being produced which turns-ON the thyristor means when a predetermined level of voltage drop effectively appears across the thyristor power terminals.

20. Power supply means of claim 17 comprising a portion of a thermostat means coupled in series with the primary power circuit means that may couple the a.c. power source with the primary a.c. load means, including:
   means for enabling and interrupting any coupling of a.c. power flow through the thermostat means in response to predetermined changes in environmental temperature;
   means coupled with the transformer means main secondary winding means effective for producing d.c. power in response to any substantial a.c. power flow coupled through the thermostat means by the enabling means; and,
   means coupled with the primary power circuit effective for producing d.c. power whenever the a.c. power flow through the thermostat means is inhibited by the interrupting means.

* * * * *